United States Patent
Yasuhara et al.

(10) Patent No.: US 10,345,325 B2
(45) Date of Patent: Jul. 9, 2019

(54) WHEEL SPEED DETECTING DEVICE, AND RING TO BE DETECTED

(71) Applicant: HONDA MOTOR CO., LTD., Tokyo (JP)

(72) Inventors: Mafumi Yasuhara, Tsuru (JP); Keita Mikura, Kikuchi-gun (JP); Kei Fukuyama, Kumamoto (JP); Takayuki Konishi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 15/553,489

(22) PCT Filed: Mar. 9, 2016

(86) PCT No.: PCT/JP2016/057369
§ 371 (c)(1),
(2) Date: Aug. 24, 2017

(87) PCT Pub. No.: WO2016/152526
PCT Pub. Date: Sep. 29, 2016

(65) Prior Publication Data
US 2018/0031595 A1 Feb. 1, 2018

(30) Foreign Application Priority Data

Mar. 20, 2015 (JP) .................. 2015-058682

(51) Int. Cl.
*G01P 3/44* (2006.01)
*B62L 3/08* (2006.01)
(Continued)

(52) U.S. Cl.
CPC ............... *G01P 3/44* (2013.01); *B60T 8/171* (2013.01); *B62L 3/08* (2013.01); *F16D 65/12* (2013.01);
(Continued)

(58) Field of Classification Search
CPC ...... G01P 3/44; B62L 3/08; B62L 1/00; F16D 65/12; B60T 8/171; B60Y 2400/3032;
(Continued)

(56) References Cited

U.S. PATENT DOCUMENTS 7,901,013 B2 * 3/2011 Ishida ................ B60T 8/171
303/137
8,430,215 B2 * 4/2013 Mikura ................ B21D 53/34
188/218 XL (Continued)

FOREIGN PATENT DOCUMENTS

EP 0666478 A1 8/1995
EP 2749465 A1 7/2014
(Continued)

OTHER PUBLICATIONS

Extended European Search Report, dated Aug. 16, 2018, for European Application No. 16768429.9.
(Continued)

*Primary Examiner* — Freddie Kirkland, III
(74) *Attorney, Agent, or Firm* — Birch, Stewart, Kolasch & Birch, LLP (57) ABSTRACT

A pulsar ring which is a detection target ring includes an annular base wall having pickup holes and a plurality of ring attachment portions protruding from an outer peripheral edge portion of the base wall and being fixed, together with a disc attachment portion of a brake disc, to a wheel of a vehicle wheel assembly. Regions corresponding to positions between adjacent ring attachment portions in an inner peripheral edge portion of the base wall are bent to form reinforcing ribs.

7 Claims, 10 Drawing Sheets

(51) Int. Cl.
  *B60T 8/171* (2006.01)
  *F16D 65/12* (2006.01)
  *B62J 99/00* (2009.01)
  *B60B 27/00* (2006.01)
  *B62L 1/00* (2006.01)

(52) U.S. Cl.
  CPC ....... *B60B 27/0052* (2013.01); *B60B 27/0063* (2013.01); *B60Y 2200/12* (2013.01); *B60Y 2400/3032* (2013.01); *B62J 99/00* (2013.01); *B62L 1/00* (2013.01)

(58) Field of Classification Search
  CPC ............ B60Y 2200/12; B60B 27/0052; B60B 27/0063; B62J 99/00
  See application file for complete search history.

(56) References Cited

U.S. PATENT DOCUMENTS

| | | | |
|---|---|---|---|
| 8,444,164 B2* | 5/2013 | Mikura | B60B 27/0068 280/279 |
| 9,145,028 B2* | 9/2015 | Mori | B60T 8/1706 |
| 9,863,973 B2* | 1/2018 | Kato | B60T 8/171 |
| 2013/0026731 A1 | 1/2013 | Mikura et al. | |
| 2014/0175857 A1* | 6/2014 | Mori | B60T 8/1706 301/6.8 |

FOREIGN PATENT DOCUMENTS

| | | |
|---|---|---|
| JP | 2012-76645 A | 4/2012 |
| JP | 2012-141184 A | 7/2012 |
| JP | 2012-202869 A | 10/2012 |
| JP | 2013-32051 A | 2/2013 |
| JP | 2013-224051 A | 10/2013 |
| WO | WO 2011/016324 A1 | 2/2011 |

OTHER PUBLICATIONS

Japanese Notice of Allowance, dated May 22, 2018, for Japanese Application No. 2017-508195, along with an English translation.
International Search Report issued in PCT/JP2016/057369 (PCT/ISA/210), dated May 17, 2016.

* cited by examiner

WHEEL SPEED DETECTING DEVICE, AND RING TO BE DETECTED

TECHNICAL FIELD

The present invention relates to a wheel speed detecting device and a detection target ring used for a vehicle such as a motorcycle to detect the rotation speed of the vehicle.

Priority is claimed on Japanese Patent Application No. 2015-058682, filed Mar. 20, 2015, the content of which is incorporated herein by reference.

BACKGROUND ART

Wheel speed detecting devices are mounted to vehicles such as motorcycles to detect the rotation speed of the wheels. Most wheel speed detecting devices used in vehicles are provided with a ring to be detected (also referred to as a detection target ring) such as a pulsar ring integrally and rotatably attached to a wheel of a wheel assembly and a rotation sensor such as a pickup sensor for detecting the rotation of the detection target ring.

A wheel speed detecting device used for a straddle-type vehicle such as a motorcycle is known in which a detection target ring is jointly fastened and fixed, together with a brake disc of a disc brake device, to a wheel of a wheel assembly, and a rotation sensor is attached to a vehicle body so as to face a detection target portion (for example, a pickup hole) of the detection target ring (see, for example, Patent Literature 1).

The detection target ring used in the wheel speed detecting device described in Patent Literature 1 includes an annular base wall having detection target portions and a plurality of ring attachment portions protruding radially outward from an outer peripheral edge portion of the base wall, wherein the outer peripheral edge portion of the base wall, which is adjacent to the ring attachment portions, is bent to improve the rigidity of the ring attachment portions. The detection target ring is disposed radially inward of the brake disc of the disc brake and the ring attachment portions protruding radially outward from the base wall are bolted, together with disc attachment portions of the brake disc, to the wheel of the wheel assembly.

In the brake device, when braking continues for a long time, much heat is generated between the brake disc and a friction material of a brake caliper and the heat thermally expands the brake disc or the wheel. In the wheel speed detecting device described in Patent Literature 1, the base wall of the detection target ring has bent portions and therefore, even when stress is applied to the ring attachment portions of the detection target ring due to thermal expansion and contraction of the brake disc or the wheel due to braking, the bent portions restrict deformation of the base wall due to the stress.

CITATION LIST

Patent Literature

[Patent Literature 1]
Japanese Unexamined Patent Application, First Publication No. 2012-76645

SUMMARY OF INVENTION

Technical Problem

In the wheel speed detecting device described in Patent Literature 1, even when the brake disc or the wheel thermally expands and contracts due to heat generated by braking, the occurrence of deformation in the base wall of the detection target ring can be restricted by the bent portions of the external peripheral edge portion. However, since the outer peripheral edge portion of the detection target ring is occupied by the bent portions, the arrangement of a rotation sensor disposed facing the detection target ring, the arrangement of a sensor cable drawn out from the rotation sensor, or the arrangement of a brake caliper for frictionally braking the brake disc are constrained by the bent portions. In addition, the bent portions are easily visible from the outside and it is thus difficult to maintain the external appearance.

Therefore, aspects of the present invention provide a wheel speed detecting device and a detection target ring which can suppress deformation of a base wall of the detection target ring due to thermal expansion and contraction of a brake disc or a wheel and can increase the degree of freedom of arrangement of members around the detection target ring and can also maintain a good external appearance.

Solution to Problem

A wheel speed detecting device according to an aspect of the present invention includes a detection target ring (30), which is integrally and rotatably attached to a wheel (27) of a vehicle wheel assembly and has a detection target portion (32), and a rotation sensor (31) which is provided on a vehicle body at a position thereon facing the detection target portion (32) and which is configured to detect rotation of the detection target ring (30), wherein the detection target ring (30) includes an annular base wall (30a) having the detection target portion (32), a plurality of ring attachment portions (30b) protruding from an outer peripheral edge portion of the base wall (30a) and being fixed, together with a disc attachment portion (25b) of a brake disc (25), to the wheel (27), and a reinforcing rib (30c) formed by bending a region corresponding to a position between adjacent ones of the plurality of ring attachment portions (30b) in an inner peripheral edge portion of the base wall (30a).

In this case, even when the brake disc (25) or the wheel (27) thermally expands and contracts due to heat generated by braking and stress is applied from the brake disc (25) or the wheel (27) to the ring attachment portion (30b) of the detection target ring (30), deformation of the base wall (30a) of the detection target ring (30) due to the stress is restricted by the reinforcing ribs (30c) on the inner peripheral edge portion of the base wall (30a). Further, since the reinforcing ribs (30c) for restricting deformation of the base wall (30a) are provided on the inner peripheral edge portion of the base wall (30a), the reinforcing ribs (30c) do not occupy the outer peripheral edge portion of the base wall (30a). Therefore, the degree of freedom of arrangement of members around the detection target ring (30) is not reduced and the external appearance is not deteriorated.

A region corresponding to a position of each of the ring attachment portions (30b) in the inner peripheral edge portion of the base wall (30a) may be a ribless region without the reinforcing rib (30c).

In this case, regions corresponding to the positions of the ring attachment portions (30b) in the inner peripheral edge portion of the base wall (30a) are not firmly held by the reinforcing ribs (30c) having high rigidity. Therefore, when stress is applied to the ring attachment portion (30b) of the detection target ring (30) due to thermal expansion and contraction of the brake disc (25) or the wheel (27), hardly any of the stress which could warp and deform the base wall (30a) of the detection target ring (30) is applied to the base wall (30a).

Distal end portions of reinforcing ribs (30c) adjacent in a circumferential direction may be connected by a bridging portion (30d).

In this case, even when slight deformation temporarily occurs in the base wall (30a) of the detection target ring (30) or the reinforcing ribs (30c) due to stress applied to the ring attachment portions (30b) of the detection target ring (30), hardly any deformation is accumulated in the base wall (30a) or the reinforcing ribs (30c) since the distal end portions of the reinforcing ribs (30c) adjacent in the circumferential direction are connected to each other by the bridging portion (30d).

The bridging portion (30d) may be formed to be curved convexly toward a center (C) in a lateral direction of a vehicle.

In this case, a load applied between the reinforcing ribs (30c) adjacent in the circumferential direction is received by the bridging portion (30d) having a curved shape, which is advantageous in terms of strength.

Notch portions (30f) may be provided on the outer peripheral edge portion of the base wall (30a) at both ends in a circumferential direction of a portion thereof from which each of the ring attachment portions (30b) protrudes.

In this case, when the brake disc (25) and the wheel (27) thermally expand and contract due to heat generated by braking and stress is applied to the ring attachment portions (30b) of the detection target ring (30), the stress is concentrated on the notch portions (30f) such that it is possible to prevent spreading of the stress over a wide area of the base wall (30a). Accordingly, adopting this structure can suppress deformation of the base wall (30a) of the detection target ring (30).

The disc attachment portion (25b) may protrude radially inward from an inner peripheral edge portion of the brake disc (25).

In this case, since the ring attachment portions (30b) of the detection target ring (30) are coupled to the disc attachment portions (25b) protruding radially inward from the brake disc (25), hardly any frictional heat generated in the brake disc (25) during braking is transferred to the detection target ring (30).

A brake caliper (26) configured to brake the brake disc (25) may be disposed above and rearward of an axle (28) supporting the wheel (27).

In this case, hardly any frictional heat generated by the brake caliper (26) flows toward the rear of the vehicle during traveling of the vehicle and is transferred to the detection target ring (30).

To solve the above problems, a detection target ring (30) according to an aspect of the present invention, which is integrally and rotatably attached to a wheel (27) of a vehicle wheel assembly and has a detection target portion (32) configured to be detected by a rotation sensor (31) provided on a vehicle body, includes an annular base wall (30a) having the detection target portion (32), a plurality of ring attachment portions (30b) protruding from an outer peripheral edge portion of the base wall (30a) and being fixed, together with a disc attachment portion (25b) of a brake disc (25), to the wheel (27), and a reinforcing rib (30c) formed by bending a region corresponding to a position between adjacent ones of the plurality of ring attachment portions (30b) in an inner peripheral edge portion of the base wall (30a).

Advantageous Effects of Invention

According to aspects of the present invention, deformation of a base wall of a detection target ring due to thermal expansion and contraction of a brake disc or a wheel can be restricted by reinforcing ribs on an inner peripheral edge portion of the base wall. Therefore, while suppressing deformation of the base wall of the detection target ring, it is possible to increase the degree of freedom of arrangement of members around the detection target ring and to maintain a good appearance.

DESCRIPTION OF EMBODIMENTS

Hereinafter, embodiments of the present invention will be described with reference to the drawings. In the following description, the directions such as forward, backward, right and left are the same as those in the vehicle described below unless otherwise noted.

The directions are indicated by an arrow FR pointing forward of the vehicle, an arrow LH pointing left of the vehicle, and an arrow UP pointing upward of the vehicle, which are shown at suitable positions in the figures used for the following description.

First, an overall configuration of the vehicle according to this embodiment will be described with reference to FIG. 1. The vehicle according to this embodiment is a motorcycle 1, which is one form of a straddle-type vehicle.

Figure 1:
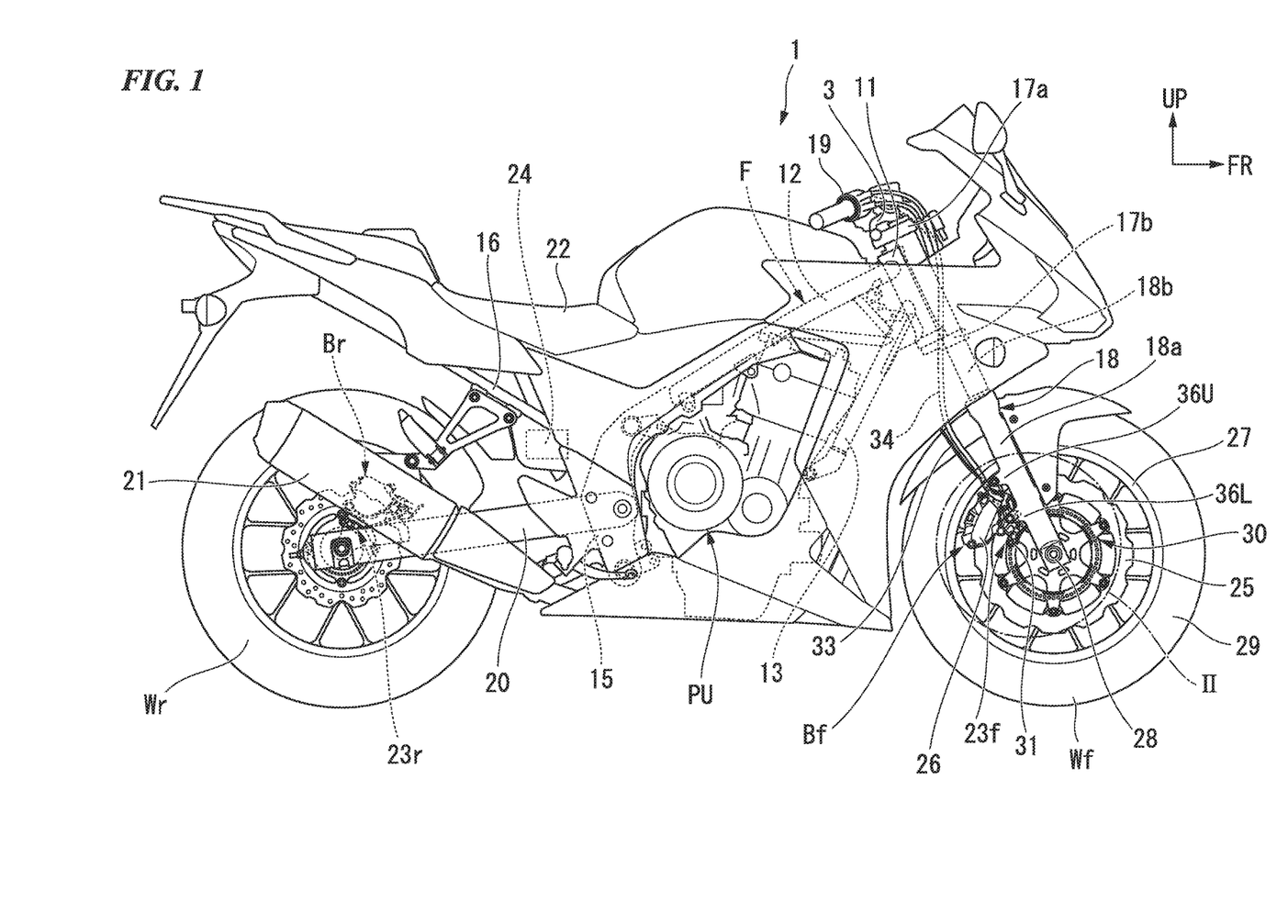
FIG. 1 is a side view of a straddle-type vehicle according to an embodiment of an aspect of the present invention.

FIG. 1 is a view of the motorcycle 1 as viewed from the right side. A body frame F of the motorcycle 1 includes a head pipe 11 at the front end thereof, a pair of right and left main frames 12 extending rearward and downward from the head pipe 11, and a pair of right and left down frames 13 extending downward from the head pipe 11 from positions thereon lower than the main frames 12, pivot frames 15 extending downward from rear end portions of the main frames 12, and a pair of right and left seat rails 16 extending rearward and upward from upper portions of the pivot frames 15.

A steering shaft (whose reference numeral is omitted) is rotatably supported by the head pipe 11. Upper and lower end portions of the steering shaft are connected respectively to a top bridge 17a and a bottom bridge 17b. The top bridge 17a and the bottom bridge 17b support upper end portions of a pair of right and left front forks 18 and a front wheel assembly Wf is rotatably supported between lower end portions of the right and left front forks 18. A bar handle 19 is attached to the top bridge 17a. The front wheel assembly Wf is steerable by turning the bar handle 19.

Front end portions of swing arms 20 supporting a rear wheel assembly Wr are supported by the pivot frames 15 such that the swing arms 20 are vertically swingable. Cushion units (not shown) are interposed between the swing arms 20 and the pivot frames 15.

A power unit PU that integrally includes an engine and a transmission is disposed in a region surrounded by the main frames 12, the down frames 13, and the pivot frames 15. The power unit PU is supported by the body frame F. The output power of an output shaft of the power unit PU can be transferred to the rear wheel assembly Wr connected thereto via a chain (not shown). In FIG. 1, reference numeral 21 denotes a muffler connected to an exhaust pipe of the engine and reference numeral 22 denotes a seat on which an occupant sits.

In the motorcycle 1 according to this embodiment, both the front wheel assembly Wf and the rear wheel assembly Wr employ disc-type brake devices Bf and Br, respectively. Further, in the motorcycle 1, a wheel speed detecting device 23f and a wheel speed detecting device 23r are provided to detect the rotation speeds of the front wheel assembly Wf and the rear wheel assembly Wr, respectively. Signals detected by the wheel speed detecting device 23f and the wheel speed detecting device 23r are output to a control unit 24 and are used, for example, to detect the slip rates of the front wheel assembly Wf and the rear wheel assembly Wr or to detect the speed of the vehicle.

Figure 2:
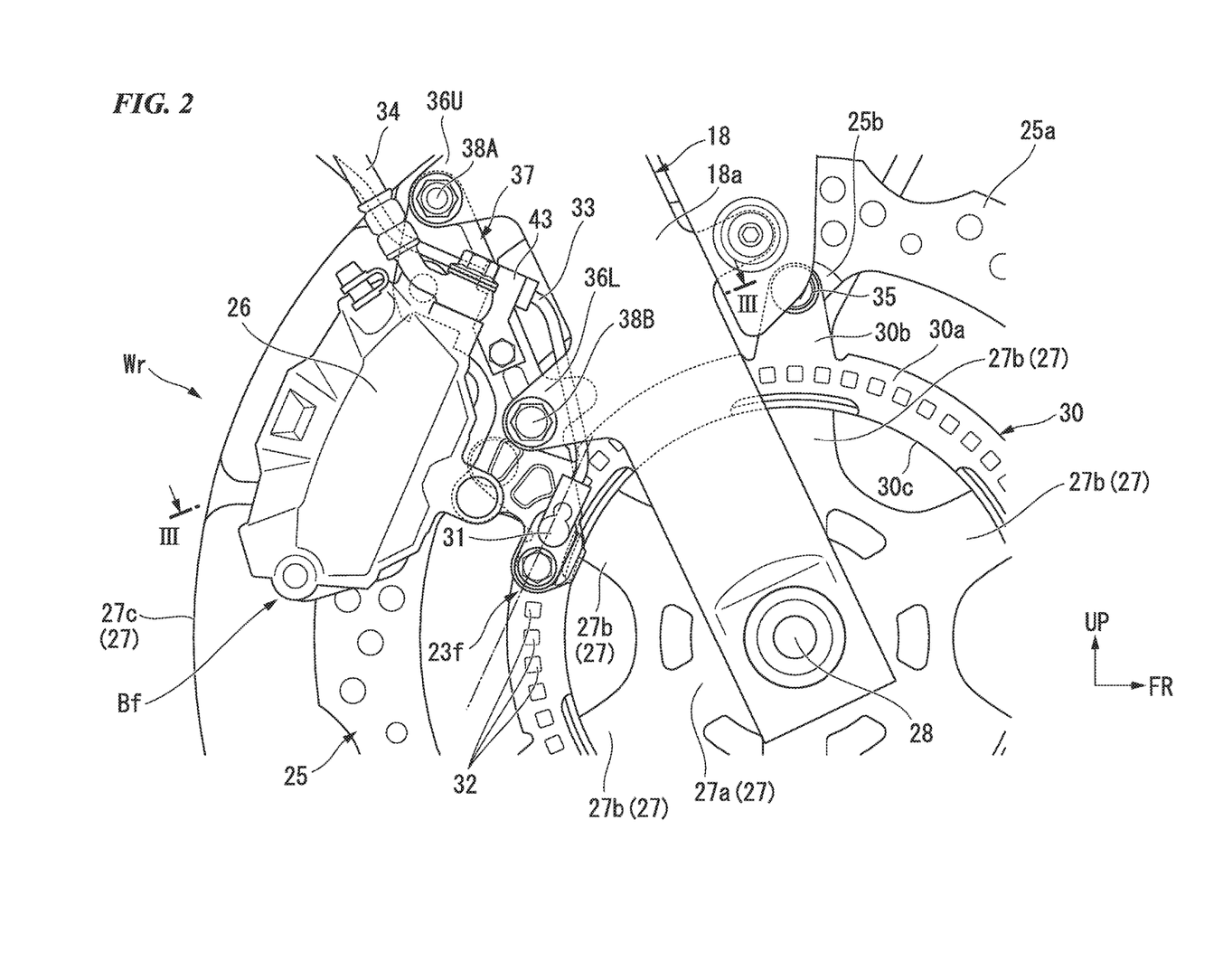
FIG. 2 is an enlarged view of a portion indicated by II in FIG. 1 of the straddle-type vehicle according to the embodiment of the aspect of the present invention.
Figure 3:
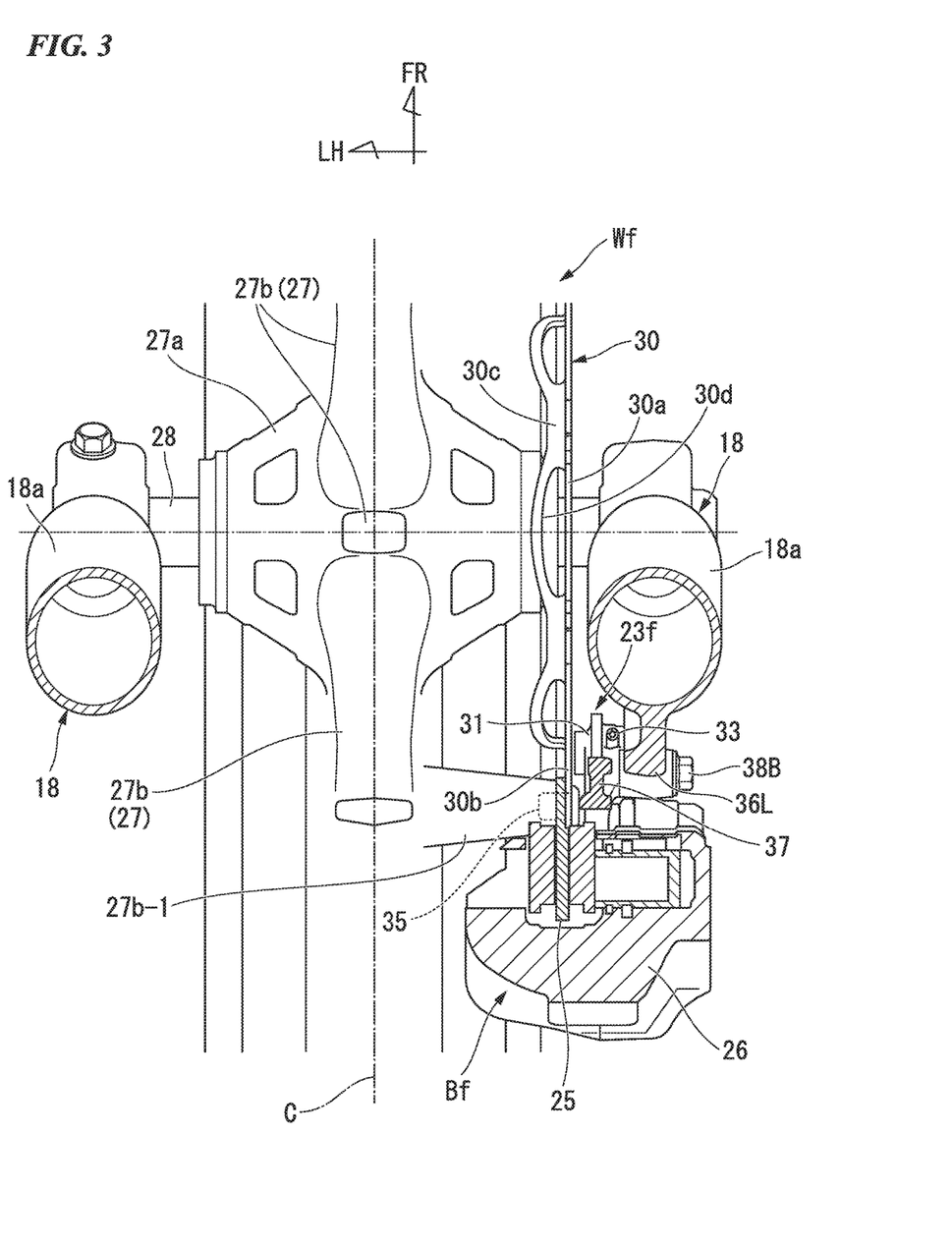
FIG. 3 is a cross-sectional view corresponding to section III-III in FIG. 2 of the saddle-type vehicle according to the embodiment of the aspect of the present invention.
Figure 4:
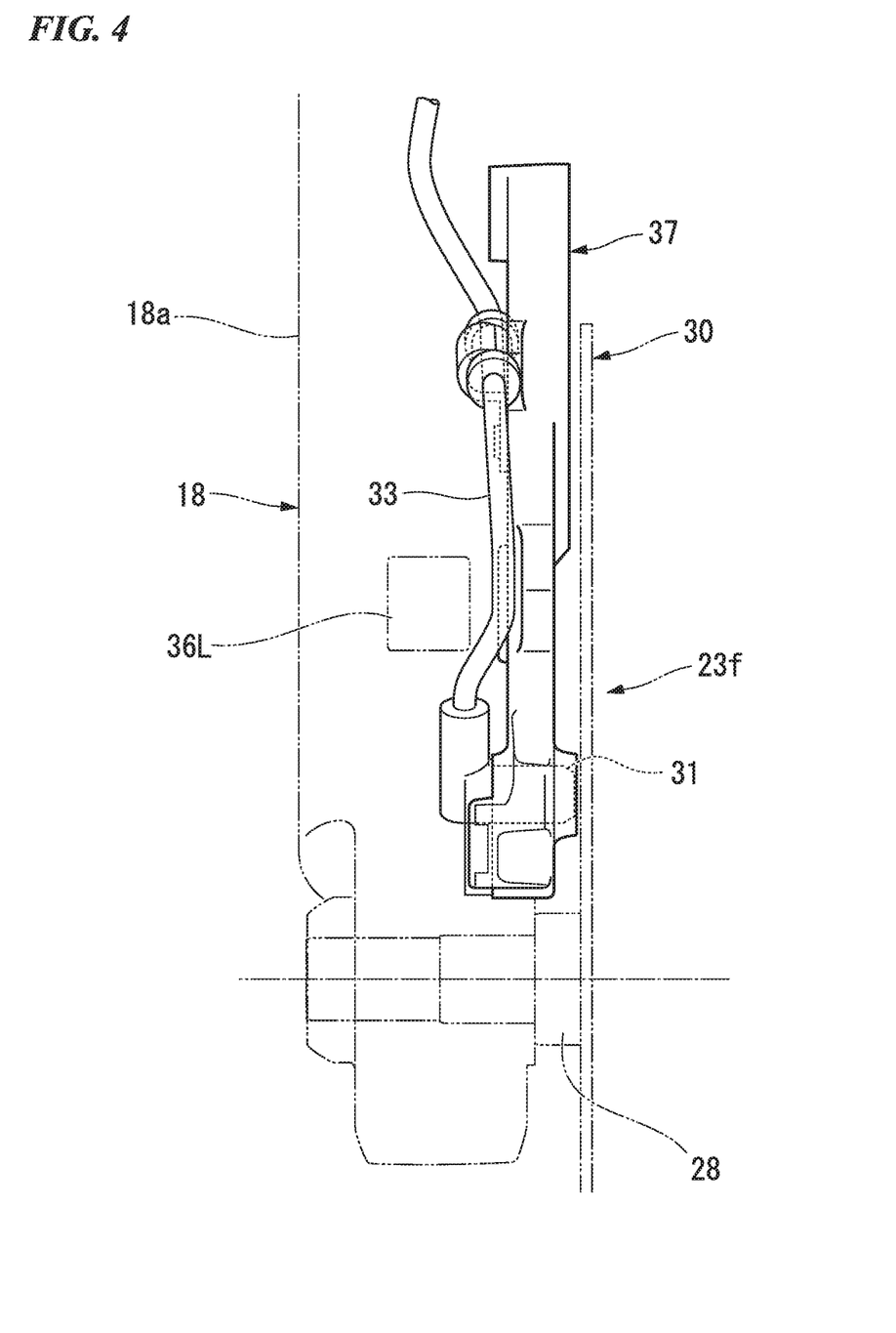
FIG. 4 is a view of a wheel speed detecting device according to the embodiment of the aspect of the present invention as seen from the front side of the vehicle.

FIG. 2 is an enlarged view of a portion II in FIG. 1. FIG. 3 is a view showing a cross-section corresponding to section III-III in FIG. 2. FIG. 4 is a view of the wheel speed detecting device 23f on the front wheel assembly Wf side as viewed from the front of the vehicle.

The brake device Bf on the front wheel assembly Wf side includes an annular brake disc 25 which rotates integrally with the front wheel assembly Wf and a brake caliper 26 which is supported by a front fork 18 and applies a frictional force to the brake disc 25 during braking. In this embodiment, the brake disc 25 is integrally attached to a right side portion of a wheel 27 of the front wheel assembly Wf and the brake caliper 26 is supported by the right front fork 18. The brake disc 25 has an annular braking wall 25a sandwiched in the brake caliper 26 during braking and a plurality of tongue-shaped disc attachment portions 25b protruding radially inward from an inner peripheral edge portion of the braking wall 25a. The brake disc 25 is fastened and fixed to a right side portion of the wheel 27 at the plurality of disc attachment portions 25b. A brake hose 34 which is connected to a master cylinder of a brake lever 3 (see FIG. 1) via an ABS circuit (not shown) is connected to an upper portion of the brake caliper 26.

The wheel speed detecting device 23f on the front wheel assembly Wf side includes a pulsar ring (a detection target ring) 30 that rotates integrally with the front wheel assembly Wf and a pickup sensor (a rotation sensor) 31 that is supported by a front fork 18 and detects the rotation of the pulsar ring 30.

In this embodiment, the pulsar ring 30 is integrally attached to a right side portion of the wheel 27 of the front wheel assembly Wf and the pickup sensor 31 is supported by the right front fork 18. The pulsar ring 30 is disposed radially inward of the brake disc 25 and is concentrically arranged, together with the brake disc 25, on the right side portion of the wheel 27.

The pulsar ring 30 has an annular base wall 30a, in which a plurality of pickup holes 32 (detection target portions) are formed at equal intervals in the circumferential direction, and a plurality of tongue-shaped ring attachment portions 30b protruding radially outward from an outer peripheral edge portion of the base wall 30a. A detailed structure of the pulsar ring 30 will be described in detail later.

The pickup sensor 31 has a pickup coil for generating pulse signals due to changes in magnetic flux caused by the rotation of the pickup holes 32 of the pulsar ring 30 and outputs the pulse signals generated by the pickup coil to the control unit 24. A sensor cable 33 is drawn out from the pickup sensor 31 and is connected to the control unit 24.

Each of the front forks 18 of this embodiment is an erect type front fork such that an outer tube 18a of the front fork 18 is positioned downward and an inner tube 18b of the front fork 18 is positioned upward. An axle 28 of the front wheel assembly Wf is supported at a lower end of the outer tube 18a. An axial center portion of the wheel 27 is rotatably supported on the axle 28 via a bearing (not shown). The front fork 18 is not limited to the erect type and may be of an inverted type.

Figure 5:
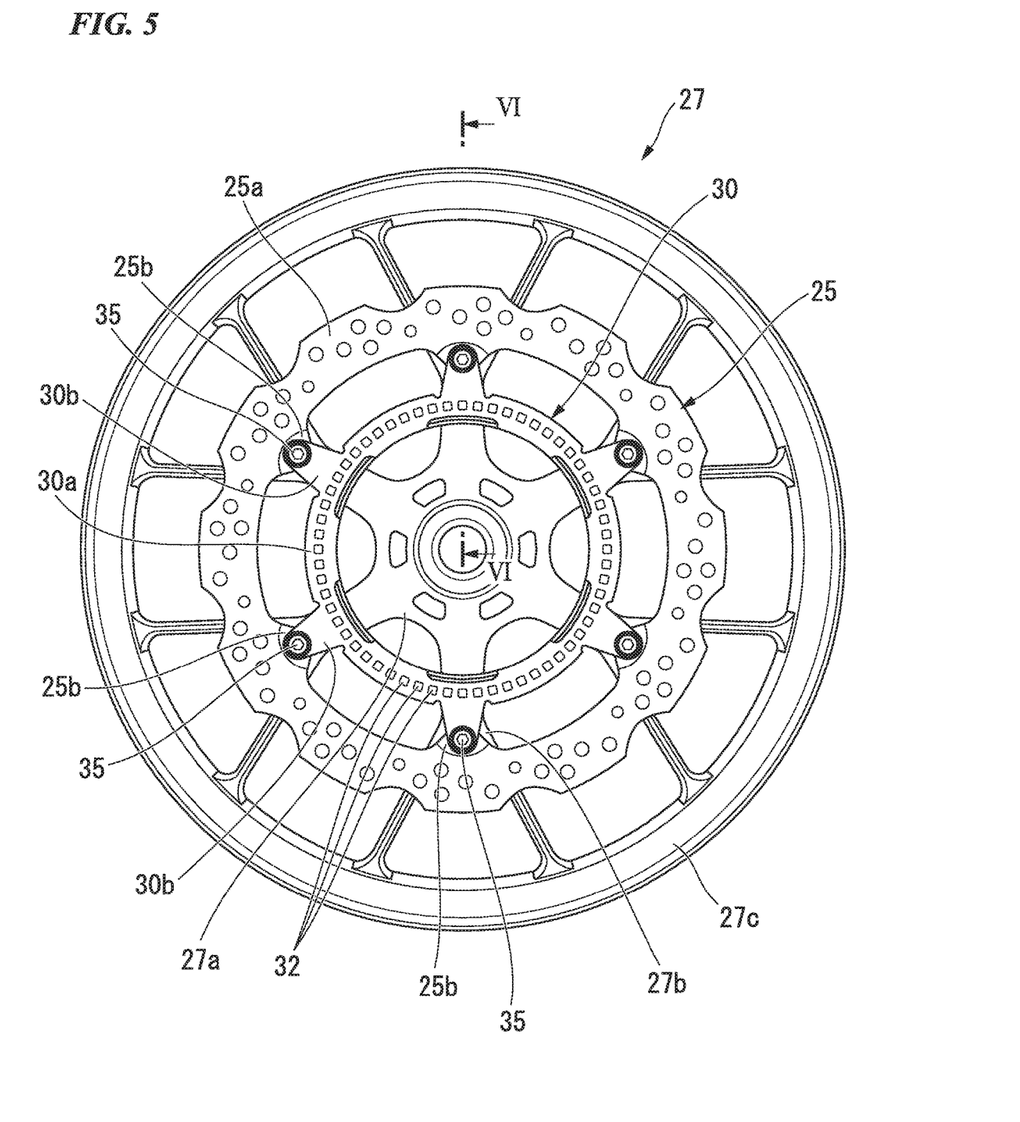
FIG. 5 is a front view of a wheel according to the embodiment of the aspect of the present invention.
Figure 6:
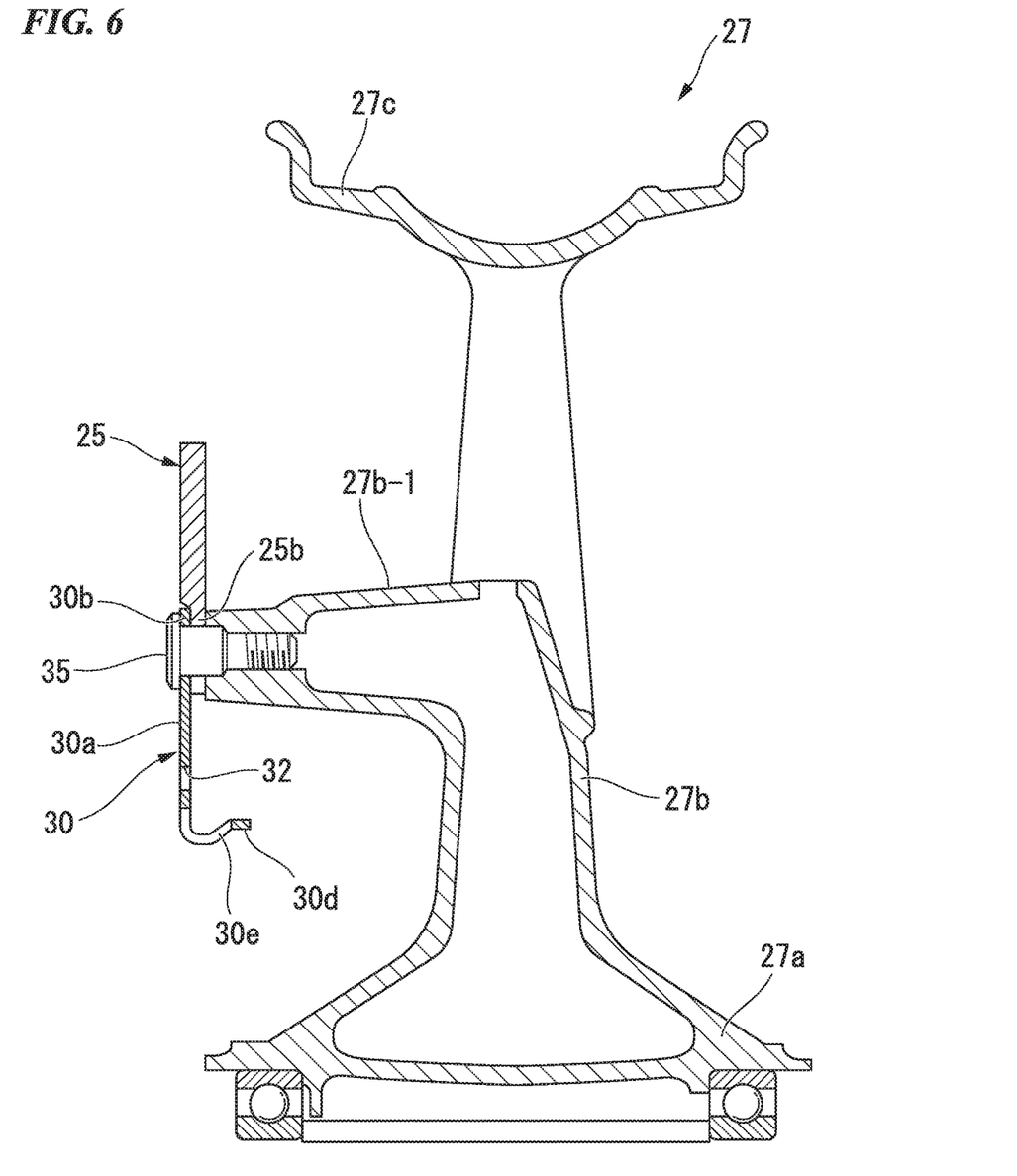
FIG. 6 is a cross-sectional view corresponding to section VI-VI in FIG. 5 of the wheel according to the embodiment of the aspect of the present invention.

FIG. 5 is a front view of the wheel 27 of the front wheel assembly Wf as viewed from the right side and FIG. 6 is a view showing a cross-section corresponding to section VI-VI in FIG. 5.

The wheel 27 of the front wheel assembly Wf has a hub 27a, spokes 27b and a rim 27c, which are integrally molded by casting or the like. The hub 27a forms an axial center portion of the wheel 27 and a plurality of spokes 27b extend radially outward from the hub 27a. Extended ends of the hubs 27a are connected to an inner peripheral portion of the rim 27c. A tire is attached to an outer peripheral portion of the rim 27c.

Boss portions 27b-1 protrude from right side surfaces of the plurality of spokes 27b of the wheel 27. The brake disc 25 and the pulsar ring 30 are jointly fastened and fixed to the boss portions 27b-1 by bolts 35 (see FIG. 2).

The front fork 18 is inclined from positions, at which it is supported by the top bridge 17a and the bottom bridge 17b, downward toward the front lower portion and a pair of rear extending stays 36U and 36L extending rearward of the vehicle are provided at a lower peripheral portion (i.e., the outer tube 18a) of the front fork 18. The rear extending stay 36U and the rear extending stay 36L are provided such that they are vertically spaced apart from each other in the axial direction of the outer tube 18a. Each of the upper and lower rear extending stays 36U and 36L is formed such that its width in the lateral direction of the vehicle is narrower than the outer diameter of the outer tube 18a and it extends rearward of the vehicle from substantially the center of the width of the outer tube 18a measured in the lateral direction of the vehicle. A brake caliper bracket 37 that holds the brake caliper 26 is fastened and fixed to the extended ends of the upper and lower rear extending stays 36U and 36L by bolts 38A and bolts 38B. The brake caliper 26 is disposed above and rearward of the axle 28 that supports the wheel 27 of the front wheel assembly Wf.

The brake caliper bracket 37 has a part (an extended portion) extending downward from its portion fastened to the rear extending stay 36U and the pickup sensor 31 is attached to the extended portion. A detection part of the pickup sensor 31 penetrates the extended portion of the brake caliper bracket 37 in the lateral direction of the vehicle and faces the base wall 30a of the pulsar ring 30 with a minute gap therebetween.

Figure 7:
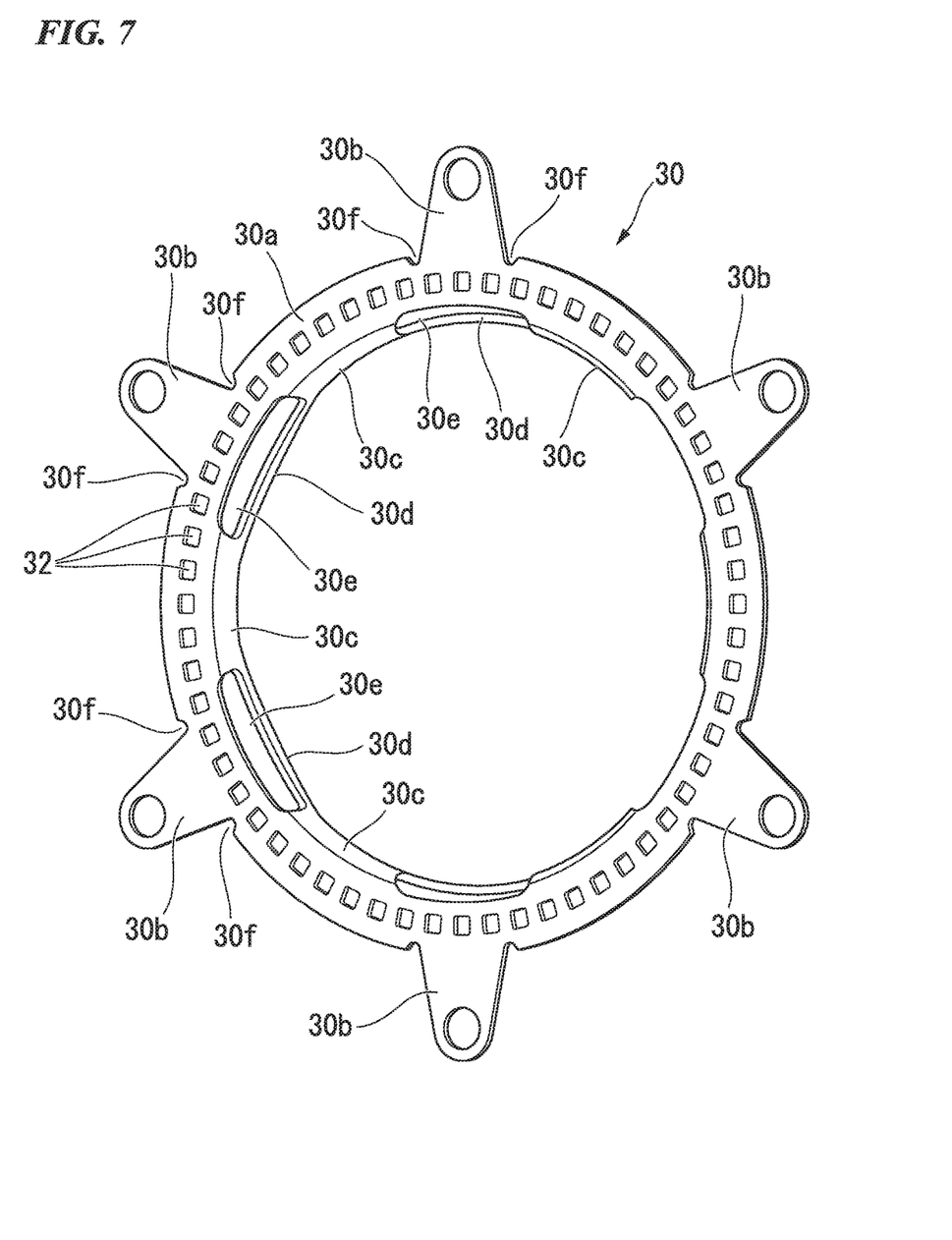
FIG. 7 is a perspective view of a detection target ring according to the embodiment of the aspect of the present invention.
Figure 8:
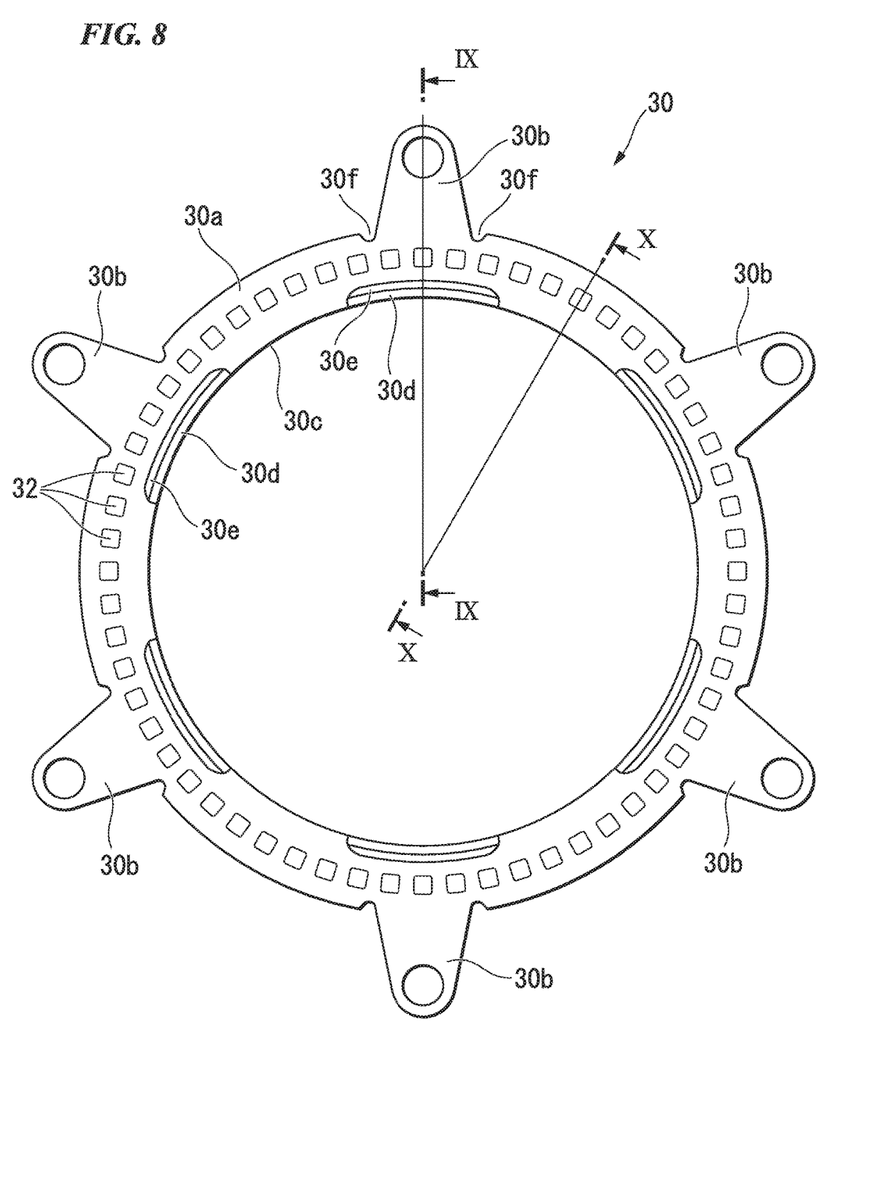
FIG. 8 is a front view of the detection target ring according to the embodiment of the aspect of the present invention.
Figure 9:
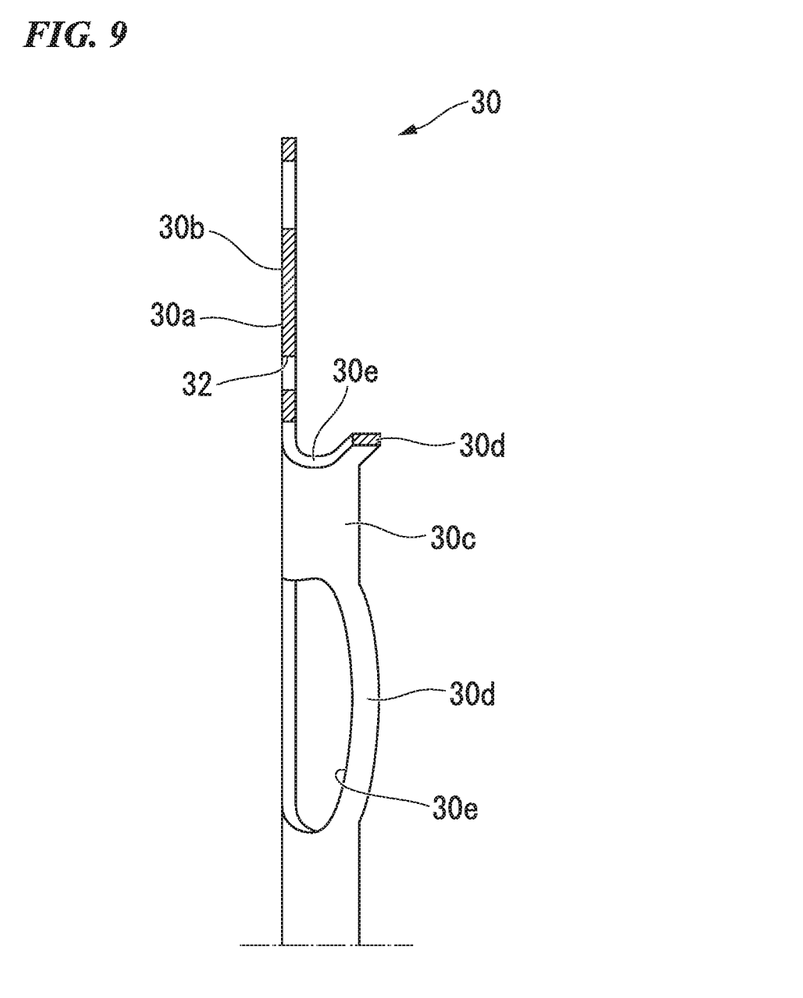
FIG. 9 is a cross-sectional view corresponding to section IX-IX in FIG. 8 of the detection target ring according to the embodiment of the aspect of the present invention.
Figure 10:
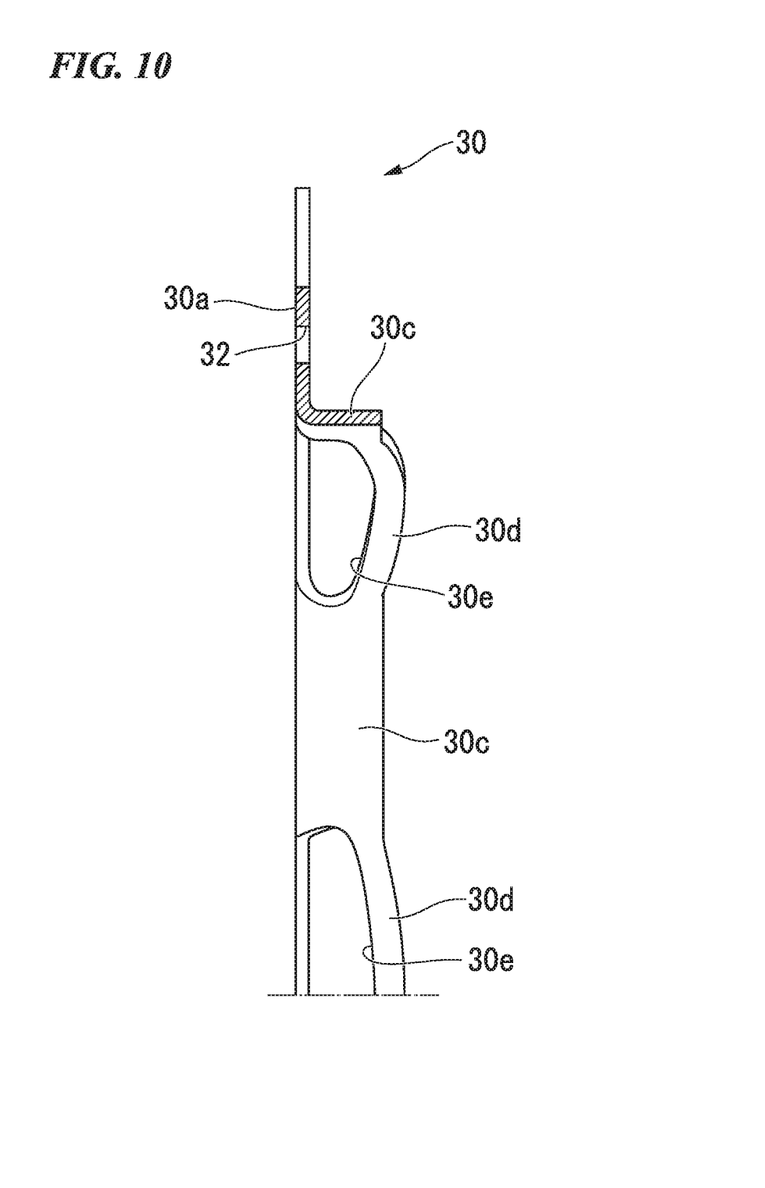
FIG. 10 is a cross-sectional view corresponding to section X-X in FIG. 8 of the detection target ring according to the embodiment of the aspect of the present invention.

FIG. 7 is a perspective view of the pulsar ring 30. FIG. 8 is a front view of the pulsar ring 30. FIG. 9 is a cross-sectional view corresponding to section IX-IX in FIG. 8. FIG. 10 is a cross-sectional view corresponding to section X-X in FIG. 8.

The pulsar ring 30 includes an annular base wall 30a having the above-described pickup holes 32, ring attachment portions 30b protruding radially outward from an outer peripheral edge portion of the base wall 30a and being fastened and fixed, together with the brake disc 25, to the wheel 27 of the front wheel assembly Wf, and a plurality of reinforcing ribs 30c formed by bending, inward in the lateral direction of the vehicle, regions corresponding to positions between adjacent ring attachment portions 30b in an inner peripheral edge portion of the base wall 30a.

The reinforcing ribs 30c formed in the inner peripheral edge portion of the base wall 30a are provided at equal intervals in the circumferential direction of the base wall 30a. Ribless regions without the reinforcing ribs 30c in the inner peripheral edge portion of the base wall 30a are provided in correspondence with regions from which the ring attachment portions 30b protrude on the base wall 30a. More precisely, each of the ribless regions is formed over a width slightly greater than the width of the proximal portion of a corresponding one of the ring attachment portions 30b on the base wall 30a. Distal end portions of reinforcing ribs 30c which are adjacent in the circumferential direction are connected by bridging portions 30d. Each of the bridging portions 30d is formed in the shape of a rod which is curved convexly toward a direction in which the reinforcing ribs 30c extend from the base wall 30a after being bent. In a state in which the pulsar ring 30 is attached to the wheel 27, the bridging portions 30d are curved convexly toward the center (see the center line C in FIG. 3) of the vehicle body measured in the lateral direction of the vehicle. Openings 30e are formed through cutting or punching with a press or the like in the inner peripheral edge portion of the pulsar ring 30 which is bent at the radially inner side of the base wall 30a. The bridging portions 30d are actually shaped as a result of the formation of the openings 30e.

Substantially U-shaped notch portions 30f are formed on the outer peripheral edge portion of the base wall 30a at both ends in the circumferential direction of a portion thereof from which each ring attachment portion 30b protrudes.

Here, the wheel speed detecting device 23r on the rear wheel assembly Wr side will not be described in detail, but the wheel speed detecting device 23r on the rear wheel assembly Wr side can employ the same pulsar ring 30 as that of the wheel speed detecting device 23f on the front wheel assembly Wf side.

As described above, in the wheel speed detecting device 23f according to this embodiment, the pulsar ring 30 includes the annular base wall 30a having the pickup holes 32 and the plurality of ring attachment portions 30b which protrude from an outer peripheral edge portion of the base wall 30a and are fastened and fixed, together with the disc attachment portions 25b of the brake disc 25, to the wheel 27 and also includes reinforcing ribs 30c for reinforcing the base wall 30a which are formed by bending regions corresponding to positions between adjacent ring attachment portions 30b in an inner peripheral edge portion of the base wall 30a. Therefore, even when the brake disc 25 and the wheel 27 expand radially due to frictional heat caused by long periods of braking or contract due to subsequent cooling with the result that stress is applied from the brake disc 25 or the wheel 27 to the ring attachment portions 30b of the pulsar ring 30, deformation of the base wall 30a due to the stress can be restricted by the reinforcing ribs 30c on the inner peripheral edge portion of the base wall 30a.

Further, in the wheel speed detecting device 23f, the reinforcing ribs 30c of the pulsar ring 30 do not occupy the outer peripheral edge portion of the base wall 30a since the reinforcing ribs 30c are provided on the inner peripheral edge portion of the base wall 30a. Therefore, there is hardly any constraint on the arrangement of the brake caliper 26 or the arrangement of the pickup sensor 31 or the sensor cable 33 around the pulsar ring 30 due to the reinforcing ribs 30c, thereby increasing the degree of freedom of arrangement of members around the pulsar ring 30. Furthermore, since the reinforcing ribs 30c are not provided on the outer peripheral edge portion of the base wall 30a, the reinforcing ribs are hardly visible from the outside and thus the external appearance is also good.

Moreover, in the wheel speed detecting device 23f according to this embodiment, the reinforcing ribs 30c are not provided on the inner peripheral edge portion of the base wall 30a of the pulsar ring 30 in regions thereof corresponding to positions from which the ring attachment portions 30b protrude. Therefore, when a large stress is applied to the ring attachment portions 30b, inner peripheral regions of the base wall 30a corresponding to the positions of the ring attachment portions 30b are not firmly held in position by the reinforcing ribs 30c having high rigidity. Accordingly, even when a large stress is applied to the ring attachment portions 30b, hardly any of the stress which could warp or deform the base wall 30a is applied to the base wall 30a. Therefore, it is possible to suppress warping and deformation of the base wall 30a.

Thus, adopting the wheel speed detecting device 23f can allow a high detection accuracy of the wheel speed to be maintained regardless of changes in the thermal environment.

Further, in the wheel speed detecting device 23f according to this embodiment, distal end portions of reinforcing ribs 30c which are adjacent in the circumferential direction of the pulsar ring 30 are connected by bridging portions 30d. Therefore, even when the base wall 30a or the reinforcing ribs 30c are slightly deformed temporarily due to stress applied to the ring attachment portions 30b, the bridging portions 30d allow the base wall 30a or the reinforcing ribs 30c to easily recover from deformation. Thus, the base wall 30a or the reinforcing ribs 30c hardly accumulate deformation, which is advantageous in maintaining high detection accuracy of the wheel speed.

In particular, in the wheel speed detecting device 23f according to this embodiment, the bridging portions 30d, which connect the reinforcing ribs 30c adjacent in the circumferential direction of the pulsar ring 30, are curved convexly toward the center in the lateral direction of the vehicle. Therefore, a load applied between the adjacent reinforcing ribs 30c can be received by the bridging portions 30d having a curved shape, which is advantageous in terms of strength.

In addition, in the wheel speed detecting device 23f according to this embodiment, notch portions 30f are formed on the outer peripheral edge portion of the base wall 30a of the pulsar ring 30 at both ends in the circumferential direction of a portion thereof from which each ring attachment portion 30b protrudes. Therefore, even when stress caused by heat is applied to the ring attachment portions 30b, the stress is concentrated on the notch portions 30f at both sides of the ring attachment portions 30b, whereby it is possible to prevent spreading of the stress over a wide area of the base wall 30a.

Accordingly, adopting this structure can suppress deformation of the base wall 30a of the pulsar ring 30 and can allow a higher detection accuracy of the wheel speed to be maintained.

Further, in this embodiment, the disc attachment portions 25b of the brake disc 25 protrude radially inward from the inner peripheral edge portion of the annular braking wall 25a. Therefore, frictional heat generated in the brake disc 25 during braking is hardly transferred to the ring attachment portions 30b of the pulsar ring 30. Therefore, there is an advantage in preventing warping and deformation of the base wall 30a of the pulsar ring 30 in advance.

Furthermore, in the wheel speed detecting device 23f according to this embodiment, the brake caliper 26 of the brake device Bf is disposed above and rearward of the axle 28 of the front wheel assembly Wf. Therefore, frictional heat generated by the brake caliper 26 easily flows toward the rear of the vehicle without being transferred toward the pulsar ring 30 when the vehicle is running. Accordingly, there is an advantage in preventing warping and deformation of the base wall 30a of the pulsar ring 30.

Aspects of the present invention are not limited to the above embodiments and various design changes are possible without departing from the gist of the invention.

REFERENCE SIGNS LIST

25 Brake disc
25b Disc attachment portion
26 Brake caliper
27 Wheel
28 Axle
30 Pulsar ring (detection target ring)
30a Base wall
30b Ring attachment portion
30c Reinforcing rib
30d Bridging portion
30f Notch portion
31 Pickup sensor (rotation sensor)
32 Pickup hole (detection target portion)

The invention claimed is:

1. A wheel speed detecting device including a detection target ring, which is integrally and rotatably attached to a wheel of a vehicle wheel assembly and has a detection target portion, and a rotation sensor which is provided on a vehicle body at a position thereon facing the detection target portion and which is configured to detect rotation of the detection target ring, wherein the detection target ring comprises:
an annular base wall having the detection target portion;
a plurality of ring attachment portions protruding from an outer peripheral edge portion of the base wall and being fixed, together with a disc attachment portion of a brake disc, to the wheel; and
a reinforcing rib formed by bending a region corresponding to a position between adjacent ones of the plurality of ring attachment portions in an inner peripheral edge portion of the base wall, and
wherein a region corresponding to a position of each of the ring attachment portions in the inner peripheral edge portion of the base wall is a ribless region without the reinforcing rib.

2. The wheel speed detecting device according to claim 1, wherein distal end portions of reinforcing ribs adjacent in a circumferential direction are connected by a bridging portion.

3. The wheel speed detecting device according to claim 2, wherein the bridging portion is formed to be curved convexly toward a center in a lateral direction of a vehicle.

4. The wheel speed detecting device according to claim 1, wherein notch portions are provided on the outer peripheral edge portion of the base wall at both ends in a circumferential direction of a portion thereof from which each of the ring attachment portions protrudes.

5. The wheel speed detecting device according to claim 1, wherein the disc attachment portion protrudes radially inward from an inner peripheral edge portion of the brake disc.

6. The wheel speed detecting device according to claim 1, wherein a brake caliper configured to brake the brake disc is disposed above and rearward of an axle supporting the wheel.

7. A detection target ring which is integrally and rotatably attached to a wheel of a vehicle wheel assembly and has a detection target portion configured to be detected by a rotation sensor provided on a vehicle body, the detection target ring comprising:
an annular base wall having the detection target portion;
a plurality of ring attachment portions protruding from an outer peripheral edge portion of the base wall and being fixed, together with a disc attachment portion of a brake disc, to the wheel; and
a reinforcing rib formed by bending a region corresponding to a position between adjacent ones of the plurality of ring attachment portions in an inner peripheral edge portion of the base wall, and
wherein a region corresponding to a position of each of the ring attachment portions in the inner peripheral edge portion of the base wall is a ribless region without the reinforcing rib.

* * * * *